United States Patent [19] [11] Patent Number: 4,798,759
Dallman et al. [45] Date of Patent: Jan. 17, 1989

[54] MULTI-LAYER POLYESTER FILM FOR MAGNETIC TAPE

[75] Inventors: Hermann Dallman, Wiesbaden-Naurod; Hartmut Hensel, Schlangenbad; Werner Schäfer, Hofheim, all of Fed. Rep. of Germany

[73] Assignee: Hoechst Aktiengesellschaft, Fed. Rep. of Germany

[21] Appl. No.: 25,465

[22] Filed: Mar. 13, 1987

[30] Foreign Application Priority Data

Mar. 26, 1986 [DE] Fed. Rep. of Germany ....... 3610167

[51] Int. Cl.$^4$ .......................... B32B 5/16; B32B 27/36
[52] U.S. Cl. ................................. 428/220; 264/235.8;
    264/290.2; 264/299; 428/323; 428/327;
    428/328; 428/331; 428/480; 428/900
[58] Field of Search ............... 428/336, 325, 458, 900,
    428/212, 213, 141, 174, 480, 220; 264/235.8,
    289.3, 290.2, 299; 528/308.2

[56] References Cited

U.S. PATENT DOCUMENTS

| 2,884,663 | 5/1959 | Alles | 264/235.8 |
|---|---|---|---|
| 2,975,484 | 3/1961 | Amborski | 264/235.8 |
| 3,165,499 | 1/1965 | Alles | 528/308.2 |
| 3,256,379 | 6/1966 | Heffelfinger | 264/289.3 |
| 3,397,072 | 8/1968 | Alles | 428/900 X |
| 3,461,199 | 8/1969 | Campbell | 264/289.3 |
| 3,515,626 | 6/1970 | Duffield | 428/325 |
| 3,958,064 | 5/1976 | Brekken et al. | 428/458 X |
| 3,983,235 | 9/1976 | Seng et al. | 514/249 |
| 3,983,285 | 9/1976 | Riboulet et al. | 428/212 |
| 4,139,518 | 2/1979 | Janocha et al. | 260/40 R |
| 4,198,458 | 4/1980 | Mitsuishi et al. | 428/212 |
| 4,320,207 | 3/1982 | Watanabe et al. | 521/54 |
| 4,550,049 | 10/1985 | Ono et al. | 428/141 |
| 4,568,599 | 2/1986 | Ono et al. | 428/141 |
| 4,568,616 | 2/1986 | Seifried et al. | 428/480 |
| 4,687,699 | 8/1987 | Hensel et al. | 428/213 |
| 4,687,700 | 8/1987 | Hensel et al. | 428/213 |

FOREIGN PATENT DOCUMENTS 208730A 5/1982 United Kingdom .

OTHER PUBLICATIONS

English translation of Japanese Patent No. 56-139551, 10/1981, Miura et al., 6 pages.

Primary Examiner—Thomas J. Herbert
Attorney, Agent, or Firm—Gregory N. Clements

[57] ABSTRACT

A coextruded, biaxially draw-oriented, multi-layer polyester film as a base film for magnetic tape is described, whose characteristics are that the total thickness of the multi-layer film is no more than 10 μm, the surface roughness of the base film on the side intended for the application of an information-carrying coating has an $R_a$ value (DIN 4768) of less than or equal to 0.010 μm and the surface roughness of the opposite side of the base film which is not intended for application of an information-carrying coating, has an $R_a$ value of greater than 0.010 μm and that the film has an E-modulus in the machine direction of greater than or equal to 6500 N/mm$^2$.

17 Claims, No Drawings

MULTI-LAYER POLYESTER FILM FOR MAGNETIC TAPE

BACKGROUND OF THE INVENTION

This invention relates to a coextruded, biaxially draw-oriented, multi-layer polyester film suitable for use as a base film for magnetic tapes.

Biaxially or multi-axially oriented polyester films, particularly polyethylene terephthalate, find extensive application in many technical areas such as the reprographics sector, as a dielectric for capacitors, as a base film for magnetic storage media such as audio, video and computer tapes, for magnetic cards and floppy discs. This is due to their superior properties such as tensile strength, tear propagation resistance, modulus of elasticity, transparency, chemical and thermal resistance.

These polyester films must meet specific requirements for the various areas of application which can be met by means of the polymer formulation or through certain process techniques during the manufacture of the film.

Polyester films which are to be processed into magnetic tape, for example, must have a low coefficient of friction and high abrasion resistance. For magnetic storage media with high information density and long playing times, thin base films with high tensile strength, especially good slip and abrasion resistance during long term stress, and good dimensional stability are required. Furthermore, the surface intended for the application of the information-carrying coating must be extremely smooth in order to eliminate interfering effects.

In order to reduce the surface roughness on the film surface which is intended for the magnetic coating, multi-layer films have been manufactured by techniques including coextrusion, such films being composed of an initial layer made of thermoplastic polymers without the addition of particles and having a smooth surface, and a second, thinner layer to which particles have been added in the usual manner.

U.S. Pat. No. 3,515,626, for example, describes films made from polyester polymers by means of coextrusion, which have at least one particle-filled layer. U.S. Pat. No. 3,983,285 describes coextruded polyester film having at least two layers having different physical properties and which contain soluble and insoluble precipitates. U.S. Pat. No. 3,958,064 describes multi-layer films having one smooth and one rough surface, which are achieved by the incorporation of two mutually insoluble polymers in the polyester layer. Finally, DE-OS No. 34 14 310 and DE-OS No. 34 14 347 describe co-extruded multi-layer base films for magnetic tape.

None of the previously available films, however, are able to simultaneously fulfill all requirements for the manufacture of magnetic storage media with higher information density, with respect to gauge, "machine direction" tensile strength, slip and abrasion resistance.

The object of this invention, therefore, was to develop a base film for magnetic tape, which is at the same time extremely thin, has a high MD tensile strength as shown by the modulus of elasticity (E-Modulus) in the machine direction (MD), and which furthermore has very good slip and abrasion resistance under extended stress.

BRIEF SUMMARY OF THE INVENTION

In one aspect, the present invention is a thin, multi-layer, coextruded, biaxially oriented polyester film having superior modulus of elasticity comprising
 (i) a first polyester film layer whose surface roughness $R_a$ is 0.010 micron or less;
 (ii) a second polyester film layer whose surface roughness $Ra$ is greater than 0.010 micron;
with the proviso that said film has a thickness no greater than 10 microns and yet has a modulus of elasticity in the machine direction of at least 6,500 N/mm$^2$.

In another aspect, the present invention is a process for the manufacture of thin, multi-layer, coextruded polyester film having a superior modulus of elasticity comprising
 (i) melting in separate extruders a first polyester resin which does not contain any particles and a second polyester resin which contains (a) from 0.01 to 1% by weight of particles having an average particle size of from 0.001 to five microns and (b) from 0.5 to 0.1 weight percent of a nucleating agent,
 (ii) simultaneously coextruding said first and second polyester resins through a die onto a cooling drum, thereby forming cast coextruded sheet,
 (iii) orienting and subsequently heat setting said cast coextruded polyester sheet to produce a biaxially oriented multilayer polyester film having a E-modulus in the machine direction of at least 6,500 N/mm$^2$, a thickness of not greater than 10 microns, a surface roughness of 0.010 micron or less on one surface and a surface roughness greater than 0.010 micron on the opposite surface.

DETAILED DESCRIPTION OF THE INVENTION

As summarized above, the present invention relates to a polyester film whose characteristics are that the surface roughness of the base film on the side intended for the application of an information-carrying coating has an $R_a$ value (DIN 4768) of less than or equal to 0.010 um and the surface roughness of the opposite side, which is not intended for the application of an information-carrying coating, has an $Ra$ value of greater than 0.010 μm, that the film gauge is a maximum of 10 microns and yet has a modulus of elasticity in the machine direction greater than or equal to 6500 N/mm$^2$.

The polyesters intended within the scope of this invention include polyester homopolymers and copolymers, mixtures of different polyesters, as well as mixtures or blends of polyesters with other polymers, and if necessary resins. The manufacture of the polyester can be done both by means of the ester interchange process for example, using the catalytic effect of zinc, magnesium, calcium, manganese, lithium or germanium salts and stabilizers such as phosphorus compounds, as well as by the direct esterification process.

Examples of suitable polyesters include polycondensates from terephthalic acid, isophthalic acid, or 2,6-naphthalene dicarboxylic acid having glycols with 2 to 10 carbon atoms such as polyethylene terephthalate, polybutylene terephthalate, poly-1,4-cyclohexylene-dimethylene terephthalate, polyethylene-2,6-naphthalene dicarboxylate, and polyethylene-p-hydroxybenzoate.

The copolyester can comprise adipic acid, glutaric acid, succinic acid, sebacic acid, phthalic acid, isophthalic acid, 5-Na-sulfoisophthalic acid or polyfunctional acids such as trimellitic acid. The polyester mixtures can comprise polyester homopolymers, polyester copolymers or polyester homopolymers and copolymers. Examples of these are mixtures of polyethylene terephthalate/polybutylene terephthalate, polyethylene isophthalate, or polyethylene isophthlate/5-sodium sulfoisophthalate. The solubility of the catalyst residue governs the selection of each polyester type since it can influence the roughness of the manufactured film.

Examples of polymers which can be added or mixed into the polyester to improve mechanical properties or to create special surface structures are polyolefin homo- or copolymers such as polyethylene, polypropylene, poly-4-methylpentene, ethylene vinyl acetate copolymers, which in turn can be saponified, ionomers, polyamides, polyacetones, polycarbonate, polytetrafluoroethylene, and polysulfones.

The resins include natural or synethic low-molecular resins having a softening point between 60° and 180° C., determined according to DIN 1995-U 4. Of the numerous low-molecular resins, the hydrocarbons, especially petroleum resins, styrene resins, cyclopentadiene and terpene resins are mentioned. A source of such resins is a by-product of the vapor cracking of hydrocarbons for the manufacture of ethylene and propylene.

At least one of the coextruded film layers, preferably the layer which determines the running behavior of the magnetic tape manufactured from the film, contains finely dispersed inorganic and/or organic particles in a size and quantity such that the surface structure of this side does not have a negative effect upon the surface roughness of the opposite side of the film or the magnetic coating of the tape.

Examples of particles include calcium carbonate, barium sulfate, silicon dioxide, natural and synthetic silicates, natural or pyrogenic aluminum oxide, titanium dioxide, zinc oxide, magnesium oxide, calcium phosphate, salts of terephthalic acid, carbon black, as well as particles of polymeric materials such as plastomers, elastomers, or duromers. Examples of organic particles include polymer particles described in U.S. Pat. No. 4,568,616. The particles can be coated with a primer in order to improve their adhesion to the matrix or, especially in the case of organic particles, could have reactive groups. They can be added to the polyester both by means of dispersion, possibly with the use of dispersing aids or coagulation inhibitor, as well as by means of a master batch.

Alternatively or in addition to the organic and inorganic pigments, the so-called catalyst precipitates, which are particles created during the polyester manufacture from the catalyst residues with monomers or polymers of the acids used, can be created to adjust the surface structure and therefore the slip behavior of the films.

The finely-distributed particles or catalyst residues have an average particle size of 0.001 to 5 μm, preferably of less than or equal to 1 μm. They are used in quantities from 0.001 to 1% by weight, preferably from 0.01 to 0.5% by weight.

In addition, at least one of the layers can contain organic additives in an amount from 0 to 10% by weight, preferably in an amount from 0 to 5% by weight, in order to improve the slip properties. Examples of this are one or more of the following substances: glycerine, mono-, di, or triesters, fatty acids, derivatives of fatty acids such as esters or amides, saturated organic acids, their salts, polysiloxanes, polyether or polyester siloxanes, or waxes.

In addition to the previously mentioned slip agents, the films according to this invention can also contain a nucleating agent in at least one layer, as well as other usual additives such as anitoxidants, thermal stabilizers, and antistatic agents (such as salts of alkylsulfonic acids or sulfonated polyoxyalkylenes).

Additives which have positive effects upon the dimensional stability, abrasion resistance and/or drawability of polyester films made of the previously described polymers include montanates, that is montane ester wax salts, palmitates, oleates, and stearates. These additives may be incorporated into the polyester film in an amount ranging from 0.01 to 5% by weight, based on the weight of the film layer.

The manufacture of the base film described above is performed according to the extrusion process, preferably according to the coextrusion process. In this process, the polymers which form the individual layers of the base film are plasticized in separate extruders, brought together through separate melt conduits, and then extruded through one die onto a cooling drum and cooled to produce an undrawn film.

The characteristic features of this process are that after cooling the coextruded film is draw oriented in a two-stage, multi-stage, and/or simultaneous process at temperatures between the glass point of the polymers and 160° C., with overall draw ratios in a range from 1.05 to 9.0, and is subsequently thermally treated, slit and wound.

The thermal post-treatment of the multi-layer film is performed within a temperature range between $T_g+70°$ C. and the melting point of the polymers and within a time interval of 0.5 to 100 seconds.

The process of draw orientation can, in principle, be performed according to several process variants.

In order to manufacture films with especially high strengths in the machine direction, the amorphous cast film can first be draw oriented in the transverse direction by a factor of 2.5 to 4.5 by means of a draw tenter, at temperatures between 80° and 150° C., and subsequently draw oriented in the MD direction using rolls driven at different rotational speeds whereby the draw temperature is preferably lower by a factor of 0.9 to 0.99 and the draw ratios are greater by a factor of 1.1 to 2.0 than during orientation in the transverse direction.

In another process variant, the amorphous film can also be draw oriented in a multi-stage process. In this, draw orientation in the machine direction is performed first in a single or multi-stage process at temperatures between 100° and 150° C. and a draw ratio between 2 and 6. Draw orientation in the transverse direction is subsequently performed at temperatures between 80° and 130° C. with a draw ratio of 2.5 to 4.5. The film is subsequently pre-heat-set if necessary, at a temperature between 100° and 130° C., and subsequently draw oriented in the machine direction once again with a draw ratio between 1.5 to 2.3 at a temperature between 90° and 150° C.

The film, which is draw oriented in the machine direction by a single or multi-stage process, can alternatively be first drawn in the tranverse direction and subsequently post-drawn in the machine and transverse directions and/or simultaneously. In every case, the film is heat set after the draw process, at a temperature between 180° and 230° C.

The films can be two-layer or multi-layer, and can have symmetrical or unsymmetrical structures. Polymers having different additives or no additives at all, and polymers with the same chemical composition but with different molecular weights and viscosities, can be joined together by coextrusion.

In its preferred form, the film according to this invention is constructed in such a way that it comprises one base layer and a cover layer applied on top of it. The free outer side of the cover layer is the surface of the base film to which is applied the information-carrying coating. This outer side has a roughness reflecting an $R_a$ value of less than or equal to 0.005 μm. The ratio of the layer thickness of the base layer to the thickness of the cover layer can be different. If the base layer is a polyester, copolyester or polyester mixture with a higher softening range, such as polyethylene terephthalate or polyethylene terephthalate/sulfoisophthalate, then the ratio of the base layer thickness to the coating layer thickness can be greater than 1, preferably greater than 2. If the base layer comprises a copolyester with a low softening range, such as polyethylene terephthalate/isophthalate, then the ratio of the base layer thickness to the coating layer thickness is less than 1, preferably less than 0.5 and especially preferred in a range from 0.5 to 0.1.

In a preferred method of execution, the cover layer does not contain particles, while the base layer preferably contains roughness-promoting particles in the quantities given above.

EXAMPLES

The following examples illustrate the practice and advantages of specific embodiments of the present invention.

The parameters given in the examples have been determined in the following manner:

(1) RSV Value:

The value indicates the reduced specific viscosity, and is measured according to DIN 53 728, sheet 2.

(2) Abrasion Resistance:

This is tested by means of an apparatus developed in-house, in which a 12 mm wide film strip is conducted at a constant speed and tension, first over cleaning rolls, then over an abrasion roll, and finally over two rubber rolls which serve as measuring rolls. The amount of deposit on the rubber rolls serves as a parameter for the abrasion resistance of the film. The measurement standards are assigned in a range from 1 (very abrasion resistant) through 6 (very great abrasion).

(3) $F_5$ Longitudinal Value:

This value gives the tear resistance of the film at 5% elongation. Measurement is performed according to DIN 53 455.

(4) E-modulus:

The modulus of elasticity is measured according to DIN 3 457.

The $F_5$ value and E-modulus are determined with a Zwick unit, type 1445 ®, whereby the measured length is 100 mm, the width of the strip is 15 mm, and the take-off speed is 110 mm/min (E-modulus) and 100 mm/min, respectively. The values given are based on five individual measurements.

(5) Coefficient of Friction:

The coefficient of friction gives the slip of the film. It is measured according to DIN 53 375.

(6) $R_a$ value:

The $R_a$ value numerically illustrates the surface roughness of the film, as the arithmetic average of all distances of the roughness profile from the center line. The measurement is done according to DIN 4768, by means of the Perthometer SP 6 ® surface measurement unit, from Feinpruf GmbH, Gottingen. The values given are based on six individual measurements, whereby the highest value is not taken into account in arriving at the average. The cut off (the length of each individual section measured) is 0.08 mm in every case.

EXAMPLE 1

Polyethylene terephthalate with an RSV value of 0.810, a residual moisture of 0.005% and the addition of 0.05% by weight cross-linked acrylate particles with an average particle diameter of 0.65 μm with extremely narrow particle size distribution and 0.1% by weight sodium montanate, and a similar, unpigmented polyester were separately melted. The melts were conducted to a die using two gear pumps (metering pumps), formed into a two-layer cast film, and cooled on a cooling drum having a surface temperature of 30° C., whereby the side of the two-layer film intended for the later application of the information-carrying coating was the side which came into contact with the cooling drum.

The cast film, which was approximately 240 μm thick, was heated with rolls, then forward drawn first at 117° C. by a factor of 3.0 and then again at 80° C. by a factor of 1.1, then transversely drawn at 110° by a factor of 4.3, pre-heat-set at 120° C., and forward drawn once again at 140° C. by a factor of 2, and finally heat set at 220° C.

The film had a total gauge of 8.2 μm, with a particle-filled layer approximately 2 μm thick. The film possessed the properties shown in Table I below:

TABLE I

| Property | Machine Direction | Transverse Direction |
|---|---|---|
| $F_5$ Value, N/mm² | 174 | 105 |
| E-modulus, N/mm² | 7,300 | 4,700 |
| Shrinkage, % (105° C., 30 min) | 1.2 | 0.2 |
| Haze, % | 3 | |
| Slip | inside/outside 30 | outside/outside 100 |
| Surface roughness ($R_a$ Value, um) | particle side 0.012 | non-filled side 0.0012 |

The abrasion resistance of the rough side, which determines running behavior of the film, was very good (grade 1).

EXAMPLE 2

A two-layer film was manufactured from a polyester similar to that in Example 1, which, however, contained 0.3% by weight barium sulfate having an average particle size of 0.6 μm and 0.05% by weight sodium montanate, related to the weight of the polyester, and from a similar polyester without additives.

The amorphous cast film was heated using rolls, and subjected to a two-stage draw process in the machine direction, whereby an over-drawn film, which was not oriented to any appreciable degree, was manufactured by drawing at 120° C. by a factor of 1.2. This over-drawn film was then draw oriented in the machine direction by a factor of 3.3 at 115° C. and then in the TD direction by a factor of 3.3 at 110° C. After pre-heat-set at 120° C., the film was draw oriented by means of rolls, once again post-forward-drawn in the machine direction at temperature of 150° C. by a factor of 1.8, and subsequently heat-set at 220° C.

The 8.5 μm thick film, having a particle-filled layer approximately 1.5 μm thick, had properties as shown in the following table:

TABLE II

| Property | Machine Direction | Transverse Direction |
|---|---|---|
| $F_5$ Value, N/mm$^2$ | 182 | 100 |
| E-modulus, N/mm$^2$ | 7,600 | 4,100 |
| Shrinkage, % (105° C., 30 min) | 1.55 | 0.15 |
| Haze, % | 10 | |
| Slip | inside/outside 32 | outside/outside 95 |
| Surface roughness ($R_a$ Value, um) | particle side 0.015 | non-filled side 0.004 |

The abrasion resistance of the particle-filled side was very good (grade 1).

EXAMPLE 3

A 7.2 μm thick film was manufactured from a polyester as in Example 1, but with the difference that it contained 0.1% by weight barium sulfate with an average particle size of 0.65 μm, as well as 0.1% by weight of a calcium salt of a montane wax partially saponified with butane diol, and from copolyester made of terephthalate acid and 3.4 mole % of a sodium salt of 5-sulfiosophthalic acid.

The approximately 95 μm thick amorphous cast film was first drawn in a draw tenter in the transverse direction, at a temperature of 96° C. by a factor of 3.4, and then in the machine direction at a temperature of 85° C. by a factor of 3.85, and finally heat set at 195° C. The film had the following properties:

TABLE III

| Property | Machine Direction | Transverse Direction |
|---|---|---|
| $F_5$ Value, N/mm$^2$ | 160 | 105 |
| E-modulus, N/mm$^2$ | 6,600 | 4,100 |
| Slip | inside/outside 30 | outside/outside 90 |
| Surface roughness ($R_a$ Value, um) | particle side 0.017 | non-filled side 0.004 |

The abrasion resistance of the film which determines running behavior was good (grade 2).

We claim:

1. A thin, coextruded, biaxially oriented multilayer film having a superior modulus of elasticity comprising
   (i) a first polyester film layer whose surface roughness $R_a$ is 0.010 micron or less;
   (ii) a second polyester film layer whose surface roughness $R_a$ is greater than 0.010 micron, said polyester film containing (a) from 0.01 to 1% by weight of particles having an average particle size of from 0.001 to five microns and (b) from 0.01 to 5 weight percent of a nucleating agent,
with the proviso that said film have a thickness not greater than 10 microns and yet has a modulus of elasticity in the machine direction of at least 6,500 N/mm$^2$.

2. The film of claim 1 wherein said first layer has a surface roughness $R_a$ not greater than 0.005 micron.

3. The film of claim 1 wherein said first layer comprises a blend of polyesters.

4. The film of claim 1 wherein said first layer comprises polyethylene terephthalate.

5. The film of claim 1 wherein said second layer comprises a blend of polyesters.

6. The film of claim 1, wherein said second layer comprises polyethylene terephthalate.

7. The film of claim 1 wherein said nucleating agent comprises sodium montanate.

8. The film of claim 1 wherein said particles are selected from the group comprising barium sulfate, a crosslinked acrylate, calcium carbonate, silicon dioxide, kaolin, and titanium dioxide.

9. The film of claim 8 wherein said particles comprise crosslinked acrylate or barium sulfate.

10. A process for the manufacture of thin, coextruded polyester film having a superior modulus of elasticity comprising
    (i) melting in separate extruders a first polyester resin which does not contain any particles and a second polyester resin which contains (a) from 0.01 to 1% by weight of particles having an average particle size of from 0.001 to five microns and (b) from 0.01 to 5 weight percent of a nucleating agent,
    (ii) simultaneously coextruding said first and second polyester resins through a die onto a cooling drum, thereby forming cast coextruded polyester sheet,
    (iii) orienting and subsequently heat setting said cast coextruded polyester sheet to produce a biaxially oriented multilayer polyester film having a E-modulus in the machine direction of at least 6,500 N/mm$^2$, a thickness not greater than 10 microns, a surface roughness of 0.010 micron or less on one surface and a surface roughness greater than 0.010 micron on the opposite.

11. The process of claim 10 wherein said nucleating agent is sodium montanate.

12. The process of claim 10 wherein heat setting is performed within a temperature range between $T_g + 70°$ C. and the melting point of the polymer.

13. The process of claim 12 wherein said heat setting is performed within a time interval of 0.5 to 100 seconds.

14. The process of claim 10 wherein said orienting is performed by stretching the film in the machine direction and in the transverse direction with an overall draw ratio lying within the range from 1.05 to 9.0.

15. The process of claim 14, wherein stretching is performed in a two-stage process.

16. The process of claim 14 wherein stretching is performed in a multi-stage process.

17. The process of claim 14 wherein stretching is performed in a simultaneous stretching process.

* * * * *